(12) United States Patent
Bloch et al.

(10) Patent No.: US 8,472,626 B2
(45) Date of Patent: Jun. 25, 2013

(54) SYSTEM AND METHOD FOR THE SECURE TRANSMISSION OF BINARY CODE BY PHASE-AND INTENSITY-CODING

(75) Inventors: Matthieu Bloch, Prevessin-Moens (FR); Jean-Marc Merolla, Foucherans (FR)

(73) Assignees: Centre National de la Recherche Scientifique—CNRS, Paris (FR); Universite de Franche-Comte Besancon, Besancon (FR)

( * ) Notice: Subject to any disclaimer, the term of this patent is extended or adjusted under 35 U.S.C. 154(b) by 412 days.

(21) Appl. No.: 12/442,697

(22) PCT Filed: Sep. 24, 2007

(86) PCT No.: PCT/FR2007/001554
§ 371 (c)(1),
(2), (4) Date: Jan. 7, 2010

(87) PCT Pub. No.: WO2008/037886
PCT Pub. Date: Apr. 3, 2008

(65) Prior Publication Data
US 2010/0111304 A1 May 6, 2010

(30) Foreign Application Priority Data
Sep. 25, 2006 (FR) ..................................... 06 08400

(51) Int. Cl.
*H04L 29/06* (2006.01)
(52) U.S. Cl.
USPC ........... 380/256; 713/150; 713/151; 713/168; 713/171

(58) Field of Classification Search
USPC ......................................................... 380/256
See application file for complete search history.

(56) References Cited

U.S. PATENT DOCUMENTS

| | | | | |
|---|---|---|---|---|
| 5,764,765 A | * | 6/1998 | Phoenix et al. | 380/283 |
| 5,768,378 A | * | 6/1998 | Townsend et al. | 380/256 |
| 6,272,224 B1 | * | 8/2001 | Mazourenko et al. | 380/283 |
| 6,801,626 B1 | * | 10/2004 | Nambu | 380/256 |
| 2002/0025041 A1 | * | 2/2002 | Tomita | 380/256 |
| 2002/0097874 A1 | * | 7/2002 | Foden et al. | 380/256 |
| 2004/0052373 A1 | * | 3/2004 | Debuisschert | 380/255 |
| 2004/0078421 A1 | * | 4/2004 | Routt | 709/201 |
| 2004/0086280 A1 | * | 5/2004 | Duraffourg et al. | 398/186 |
| 2004/0109564 A1 | * | 6/2004 | Cerf et al. | 380/256 |

OTHER PUBLICATIONS

Genin et al., Chaotic oscillations of the optical phase for multigigahertz-bandwidth secure communications, Mar. 2004, IEEE Journal of Quantum Electronics, vol. 40, No. 3, pp. 294-298.*

* cited by examiner

*Primary Examiner* — Taghi Arani
*Assistant Examiner* — Kenneth Chang
(74) *Attorney, Agent, or Firm* — Arent Fox LLP

(57) ABSTRACT

The invention relates to a system (EM, RE) for the optical transmission of a binary code. The invention makes it possible to carry out a coding of the bits transmitted in terms of intensity and phase by choosing a first base in which the signals coding the bits are distinguished only by a first physical quantity, and a second base in which the signals coding the bits are distinguished only by a second physical quantity.

12 Claims, 7 Drawing Sheets

SYSTEM AND METHOD FOR THE SECURE TRANSMISSION OF BINARY CODE BY PHASE-AND INTENSITY-CODING

CROSS-REFERENCE TO RELATED APPLICATION

This application is a National Stage entry of International Application No. PCT/FR2007/001554, filed Sep. 24, 2007, which claims priority of French Application No. 06/08400. The disclosure of the prior application is hereby incorporated in its entirety by reference.

The present invention relates to a system for the secure optical transmission of binary code.

It also relates to a method for the secure optical transmission of a binary code.

In theory, the absolute confidentiality of a transmission line can be ensured if an information carrier signal corresponding to a message is encrypted by the addition, by means of an exclusive OR operator, of a random encrypting key. The message thus coded and sent is impossible to decipher if this key, of the same length as the message to be deciphered, is used only once. However, an encrypting algorithm makes sense only if the key shared by the legitimate correspondents is completely secret.

The laws of quantum mechanics offer the possibility of solving this problem by providing unconditional security to the transmission of an encrypting key.

Numerous key-sharing protocols have been imagined by coding each bit of the key on a quantum state of a photon.

The first in terms of date was presented by Bennett et al in the article C H Bennett, G Brassard "Quantum Cryptography: Public Key Distribution and Coin Tossing", Proceeding of IEEE International on computers, Systems and Signal Processing, Bangalore, India, (IEEE New York, 1984) pp 175-179, in which an exchange protocol is proposed with four states forming two conjugate bases, commonly referred to as a 4-state protocol or BB84 protocol.

A second protocol, also presented by Bennett, commonly referred to as a 2-state protocol or B92 protocol, consists of coding the bits of the key on two non-orthogonal states. This protocol is described in the publication by C H Bennett "Quantum cryptography using any two non-orthogonal states", Physical Review Letters, vol 68, pp 3121-3124, 1992.

In these two protocols, the transmitter, normally referred to as Alice, prepares the photon in a state chosen randomly among the states available. The receiver, normally referred to as Bob, analyses each state of the incident photons by a measurement. If a spy, normally referred to as Eve, attempts to listen to the secret transmission line, she will have in her turn to perform a measurement in order to know the state of the photons sent by Alice. The use of a photon associated with the key exchange protocol limits the quantity of information that can be extracted by the spy on the transmission channel. Measuring the various parameters, the error rate and the transmission rate enables the legitimate correspondents to estimate whether this quantity of information is less than that which they share. When the quantity of information shared by the legitimate correspondents is greater than the information known to the spy, a confidential key can be shared. Other exchange schemes based on EPR (Einstein, Podolsky, Rosen) photon transmission or using other codings have been developed.

Various techniques have been proposed for preparing the photon in the required states.

A first technique consists of using the polarization state of the photon and was described for example in the publication by J Breguet, A Muller, N Gisin "Quantum Cryptography with Polarized Photons in Optical Fibres", Journal of Modern Optics, vol 41, no 12, pp 2405-2412, 1994. On sending, the 1 bit can be represented by a right-hand circular or vertical polarisation whereas a 0 bit can be represented by a left-hand circular or horizontal polarisation. On reception, Bob chooses, randomly and independently of Alice, the base in which he analyses the state of the incident photon.

A second coding technique proposes the use of the relative phase introduced between single-photon pulses for coding the information. Alice and Bob each use an unbalanced fibre interferometer for respectively introducing and measuring this relative phase difference. Each bit is represented randomly by an optical phase-difference value. This system thus uses the properties of interference to a photon in the temporal domain. Each interferometer has on one of its arms an optical phase shifter allowing the transmission of the key. Thus, at the output from the Alice interferometer, two pulses are observed separated by a temporal delay. At the output of the Bob interferometer, three pulses are observed. The first and third come respectively from the pulses that followed the shortest and longest paths within the two interferometers. The second corresponds to the superimposition of the pulses shifted in phase by Alice and delayed by Bob and pulses delayed by Alice and phase-shifted by Bob. The intensity of the second pulse therefore depends on the phase shifting introduced by both Bob and Alice. It is this that is used for obtaining an encrypting key. Different variants of this technique are described in particular by the U.S. Pat. No. 5,307,410 and the article by C Marand and P D Townsend, "Quantum key distribution over distances as long as 30 km," Opt. Lett, vol 20, no 16, pp 1695-1697, 1995.

In a third technique, which was the subject matter of French patent application FR 2763193, Alice codes each bit of the key by a phase difference introduced between various spectral components obtained by optical modulation. The phase difference is chosen randomly between two values. Bob modulates the light in order to generate frequency components from the components generated by Alice. Bob introduces a second phase difference, chosen independently of Alice, between the various frequency components that he has been able to generate. By using the properties of interference to a photon in the modulation sidebands, Bob is capable of finding the quantum state of the incident photons. This transmission method makes it possible in particular to use standard electro-optical components. It is compact, which minimise the effects of external instabilities. Thus it can be installed on a standard network. This method, which uses the relative phase only for coding the information, does not allow the use of a four-state protocol.

A system for the optical transmission of a binary code comprising a transmitter and a receiver and a reception line extending between said transmitter and said receiver is also known in the prior art, said sender comprising:
  generation means arranged to generate an electromagnetic signal;
  transmission modification means arranged to modify at least one physical quantity characterising the said electromagnetic signal according to the said binary code so as to generate a modified transmission signal;
the said transmission line being arranged to transmit the said modified transmission signal to the said receiver;
the said receiver comprising
  reception modification means arranged to modify the said modified transmission signal so as to generate a modified reception signal;

detection means arranged to detect at least one of the physical quantities characterising the said modified reception signal.

Such a system is for example described in the PCT application WO 02/49267. This application teaches that the modification means of the transmitter comprise phase shifting means that impose a phase shift that is chosen randomly so as to be equal to 0 or $\pi/2$ for a first bit value and $\pi$ or $3\pi/2$ for a second bit value. The possible phase difference values $\{0, \pi\}$ and $\{\pi/2, 3\pi/2\}$ correspond respectively to two quantum state bases B1 and B2 used to express the 0 and 1 bits. On sending, Alice randomly chooses a base from the two bases. If Alice chooses the base B1, she will express the 0 bit by a phase of 0, and the 1 bit by a phase of $\pi$. If she chooses the base B2, she will express the 0 bit by a phase of $\pi/2$ and the 1 bit by a phase of $3\pi/2$. On reception, Bob randomly chooses, independently of Alice, one of the two bases B1 and B2 in order to measure the bit received. If the two bases chosen on sending and reception are the same, the detection of a bit is possible. If the two bases chosen are different, Bob will not be able to determine the bit transmitted. The bases used allow the use of a four-state protocol as described above.

In this document, the various states used are therefore differentiated solely by the phase.

The above techniques do however have several drawbacks. For the first technique, it is necessary to strictly keep the polarisation throughout the transmission. To solve this problem polarisation maintenance fibres are needed, but such fibres are not installed on existing networks. The second solution that can be envisaged is to control the polarisation throughout the transmission. This solution greatly complicates the system since it is necessary to regularly control the fluctuation in polarisation, the consequence of which is reducing the transmission rate of the key.

For the second technique, the distribution systems based on this method use a pair of transmitting/receiving interferometers with significant differences in operation. The difficulty is keeping constant the delay between the two arms with great precision despite thermal and mechanical instabilities.

For the third technique, only the two-state B92 protocol can be used with the configuration proposed, unlike the first two techniques, which use the BB84 four-state protocol. The use of a low modulation rate does not allow effective use of a single-photon source. The modulation rate being around 10%, for each photon generated the probability of transmission will be 0.1. Thus the method is well suited to an attenuated pulse-type laser source.

The fourth technique allows the use of numerous protocols and in particular the four-state B884 protocol but does not allow the effective use of a single-photon source.

The invention aims to overcome the drawbacks of the prior art.

One aim of the invention is to provide an alternative to the existing binary code optical transmission systems.

Another aim of the invention is to provide a system arranged to express bits of a binary code in bases allowing secure transmission between a sender and receiver and detection of the bits by the receiver.

Another aim of the invention is to be able to effectively use single-photon sources with standard integrated electro-optical components.

At least one of these aims is achieved by the invention, the subject matter of which is a system for the optical transmission of a binary code comprising a transmitter and a receiver and a reception line extending between the said transmitter and the said receiver the said transmitter comprising:
generation means arranged to generate an electromagnetic signal;
transmission modification means arranged to modify at least one physical quantity characterising the said electromagnetic signal according to the said binary code so as to generate a modified transmission signal;
the said transmission line being arranged to transmit the said modified transmission signal to the said receiver;
the said receiver comprising
reception modification means arranged to modify the said modified transmission signal so as to generate a modified reception signal;
detection means arranged to detect at least one of the physical quantities characterising the said modified reception signal
in which the said transmission modification means are arranged to modify the value of at least a first physical quantity and a second physical quantity characterising the said electromagnetic signal so as to generate the said modified transmission signal, the said modified transmission signal being chosen randomly from at least a first type of modified transmission signal and a second type of modified transmission signal,
in which, for the said first type of modified transmission signal, the said first physical quantity is constant, and the said second physical quantity depends on a bit value of the said binary code, and for the said second type of modified transmission signal the said second physical quantity is constant and the said first physical quantity depends on a bit value of the said binary code,
and in which the said detection means are arranged to determine a value of the said first physical quantity and a value of the said second physical quantity.

The first type of signal and the second type of signal therefore correspond to two bases B1 and B2 in which the bits transmitted by Alice can be expressed. On sending, Alice randomly chooses one base from the two bases, that is to say one type of signal from the two types of signal. If Alice chooses the base B1, she will for example express the 0 bit by a first value of the first physical quantity and the 1 bit by a second value of the first physical quantity, the other physical quantity being constant. Likewise, if Alice chooses the base B2, she will for example express the 0 bit by a first value of the second physical quantity and the 1 bit by a second value of the second physical quantity, the other physical quantity being constant. In this way, Bob will be able to determine the bits transmitted by analysis of the signal received.

The use of two different physical quantities allows the implementation of an effective transmission system using components of the integrated optics as well as single-photon sources.

The said first physical quantity may be the intensity of the spectral components of the said electromagnetic signal and the said second physical quantity may be the relative phase of the spectral components of the said electromagnetic signal.

According to one embodiment of the invention, the said transmission modification means may comprise transmission modulation means arranged to modulate the said electromagnetic signal according the said binary code so as to generate the said modified transmission signal, the spectral components of the said first type of modified transmission signal having a first intensity and a first relative phase, the spectral components of the said second type of modified transmission signal having a second intensity and a second relative phase; the said first intensity of the spectral transmission components having a first value of first intensity for a first bit value of the said binary code, and a second value of first intensity for a second bit value of the said binary code, the said first value of first intensity modified being equal to the said second value of first intensity modified, the said first relative phase of the spectral transmission components having a first value of a first relative transmission phase for a first bit value of the said binary code, and a second value of the first relative transmission phase for a second bit value of the said binary code, the said first value of the first relative transmission phase being different from the said second value of the first relative transmission phase, the said second transmission intensity of the spectral components having a first value of second transmission intensity for a first bit value of the said binary code, and a second value of second transmission intensity for a second bit value of the said binary code, the said first value of second transmission intensity being different from the said second value of second transmission intensity, the said second relative phase of the spectral transmission components having a first value of a second relative transmission phase for a first bit value of said binary code, and a second value of a second transmission phase for a second bit value of said binary code, the said first value of a second relative transmission phase being equal to the said second value of a second relative transmission phase, and the said reception modification means can comprise reception modulation means arranged to generate a reception modulation signal and to modulate the said modified transmission signal by the said reception modulation signal, the said reception modulation signal being generated randomly from a first type of reception modulation signal and a second type of reception modulation signal, the said detection means being arranged to selectively detect the said first value of first relative phase of the spectral transmission components or the said second value of first relative phase of the spectral transmission components when the said modified reception signal corresponds to a modulation by the said first type of reception modulation signal, and to selectively detect the said first value of second intensity of the spectral transmission components or the said second value of second intensity of the spectral transmission components when the said modified reception signal corresponds to a modulation by the said second type of modulation signal.

According to this embodiment, the reception means are such that it is possible to detect the bit sent when the base used for reception is the same as that used for sending. For this purpose, the modulation means randomly generate either a first reception modulation signal corresponding to a reception measurement base equal to the first base or a second reception modulation signal corresponding to a reception measurement base equal to the first base. In this way, in the case of an identical choice of the first base on sending and on reception, the relative phase of the spectral components of the sending signal makes it possible to distinguish the sending of a 0 bit from 1 bit. In the same way, in the case of an identical choice of the second base on sending and reception, the intensity of the spectral components of the transmission signal make it possible to distinguish the sending of a 0 bit or a 1 bit.

In the case of a choice of a different base on sending and reception, the value of the bit sent cannot be determined since the two values are equiprobable.

This embodiment therefore makes it possible to effect a coding of the bits transmitted in intensity and phase choosing a first base in which the spectral components of the signals coding the bits are distinguished only by the phase, and a second base in which the spectral components of the signals coding the bits are distinguished only by the intensity.

These two bases allow the implementation of a four-state protocol.

Still in this embodiment, the said transmission modulation means can comprise:
  a first generator arranged to generate a first electrical signal;
  transmission signal modification means arranged to modify the said first electrical signal so as to generate a modified electrical signal;
  a transmission modulator arranged to modulate the said electromagnetic signal by the said modified electrical signal so as to generate the said modified transmission signal and the said reception modulation means can comprise:
  a second generator arranged to generate a second electrical signal;
  a reception modulator arranged to modulate the said modified transmission signal by means of the said second electrical signal.

Still in this embodiment, the said transmission signal modification means can comprise a first attenuator arranged to fix the intensity of the said modified electrical signal at a first electrical signal intensity value for a first bit value of the said binary code, and at a second electrical signal intensity value for a second bit value of the said binary code, and a phase shifter arranged to fix the phase of the said modified electrical signal at a first electrical signal phase value for a first bit value of the said binary code, and at a second electrical signal phase value for a second bit value of the said binary code.

The invention also concerns a transmitter in an optical code transmission system comprising:
  generation means arranged to generate a first electromagnetic signal;
  transmission modification means arranged to modify at least one physical quantity characterising the said electromagnetic signal according to the said binary code so as to generate a modified transmission signal;

in which the said transmission modification means are arranged to modify the value of at least a first physical quantity and a second physical quantity characterising the said electromagnetic signal so as to generate the said modified transmission signal, the said modified transmission signal being chosen randomly from at least a first type of modified transmission signal and a second type of modified transmission signal, in which, for the said first type of modified transmission signal, the said first physical quantity is constant, and the said second physical quantity depends on a bit value of the said binary code, and for the said second type of modified transmission signal the said second physical quantity is constant and the said first physical quantity depends on a bit value of the said binary code.

As before, the said first physical quantity can be the intensity of the spectral components of the said electromagnetic signal or the relative phase of the spectral components of the said electromagnetic signal.

According to an embodiment of the aforementioned transmitter the said transmission modification means may comprise transmission modulation means arranged to modulate the said electromagnetic signal according the said binary code so as to generate the said modified transmission signal, the spectral components of the said first type of modified transmission signal having a first intensity and a first relative transmission phase, the spectral components of the said second type of modified signal having a second intensity and a second relative phase;

the said first transmission intensity of the spectral components having a first value of first transmission intensity for a first bit value of the said binary code, and a second value of first transmission intensity for a second bit value of the said binary code, the said first value of the first intensity modified being equal to the said second value of first intensity modified, the said first relative phase of the spectral transmission components having a first value of a first relative transmission phase for a first bit value of the said binary code, and a second value of a first relative transmission phase for a second bit value of the said binary code, the said first value of a first relative transmission phase of the spectral transmission components being different from the said second value of a first relative phase of the spectral transmission components, the said second intensity of the spectral transmission components having a first value of a second transmission intensity for a first bit value of the said binary code, and a second value of second transmission intensity for a second bit value of the said binary code, the said first value of a second transmission intensity being different from the said second value of second transmission intensity, the said second relative phase of the spectral transmission components having a first value of a second relative transmission phase for a first bit value of said binary code, and a second value of a second transmission phase for a second bit value of the said binary code, the said first value of a second relative transmission phase being equal to the said second value of a second relative transmission phase.

According to this embodiment, the said transmission modulation means can comprise:

a first generator arranged to generate a first electrical signal;

transmission signal modification means arranged to modify the said first electrical signal so as to generate a modified electrical signal;

a transmission modulator arranged to modulate the said electromagnetic signal by the said modified electrical signal so as to generate the said modified transmission signal.

According to one embodiment, the said transmission signal modification means can comprise a first attenuator arranged to fix the intensity of the said first and second type of modified electrical signal at a first electrical signal intensity value for a first bit value of the said binary code, and at a second electrical signal intensity value for a second bit value of the said binary code, and a phase shifter arranged to fix the phase of the said first type of modified electrical signal at a first electrical signal phase value for a first bit value of the said binary code, and at a second electrical signal phase value for a second bit value of the said binary code.

The invention also concerns a receiver in a binary code optical transmission system, said receiver being arranged to receive the said modified transmission signal transmitted by a transmitter as previously described, the said receiver comprising:

reception modification means arranged to modify the said modified transmission signal so as to generate a modified reception signal;

detection means arranged to detect the physical quantities characterising the said modified reception signal in which the said detection means are arranged to determine a value of the said first physical quantity and a value of the said second physical quantity.

According to one embodiment of the receiver, the said reception modification means can comprise reception modulation means arranged to generate a reception modulation signal and to modulate the said modified transmission signal by the said reception modulation signal; the said reception modulation signal being generated randomly from a first type of reception modulation signal and a second type of reception modulation signal, the said detection means being arranged to selectively detect the said first value of a first relative phase of the spectral transmission components or the said second value of a first relative phase of the spectral transmission components when the said modified reception signal corresponds to a modulation by the said first type of reception modulation signal, and to selectively detect the said first value of second intensity of the spectral transmission components or the said second value of second intensity of the spectral transmission components when the said modified reception signal corresponds to a modulation by the said second type of modulation signal.

The invention also concerns a method for the optical transmission of a binary code between a sender and a destination in which the said sender generates an electromagnetic signal characterised by a set of physical-quantities;

modifies at least one value of at least one of the physical quantities characterising the said electromagnetic signal according to the said binary code so as to generate a modified transmission signal;

the said destination receives the said modified transmission signal;

modifies the said modified transmission signal so as generate a modified reception signal;

detects the value of at least one of the physical quantities of the said modified reception signal and in this method, the said sender modifies at least the value of a first physical quantity and a second physical quantity characterising the said electromagnetic signal so as to generate the said modified transmission signal, the said modified transmission signal being chosen randomly from at least a first type of modified transmission signal and a second type of modified transmission signal, in which, for the said first type of modified transmission signal, the value of the said first physical quantity is constant and the value of the said second physical quantity depends on a bit value of the said binary code, and for the said second type of modified transmission signal the value of the second physical quantity is constant and the value of the said first physical quantity depends on a bit value of the said binary code, the said destination determines a value of the said first physical quantity and a value of the said second physical quantity.

In this method, the said first physical quantity can be the intensity of the spectral components of the said electromagnetic signal and the said physical quantity can be the relative phase of the spectral components of the said electromagnetic signal.

According to one embodiment of the method, the said sender can modulate the said electromagnetic signal according to the said binary code so as to generate the said modified transmission signal, the spectral components of the said first type of modified transmission signal having a first intensity and a first relative transmission phase, the spectral components of the said second type of modified transmission signal having a second transmission intensity and a second relative transmission phase the said first intensity of the spectral transmission components having a first value of first intensity for a first bit value of the said binary code, and a second value of first intensity for a second bit value of the said binary code, the said first value of first intensity modified being equal to the said second value of first intensity modified, the said first relative phase of the spectral transmission components having a first value of a first relative transmission phase for a first bit value of the said binary code, and a second value of a first relative transmission phase for a second bit value of the said binary code, the said first value of a first relative transmission phase being different from the said second value of a first relative transmission phase, the said second intensity of the spectral transmission components having a first value of a second transmission intensity for a first bit value of the said binary code, and a second value of second transmission intensity for a second bit value of the said binary code, the said first value of a second transmission intensity being different from the said second value of second transmission intensity, the said second relative phase of the spectral transmission components having a first value of a second relative transmission phase for a first bit value of the said binary code, and a second value of a second transmission phase for a second bit value of the said binary code, the said first value of a second relative transmission phase being equal to the said second value of a second relative transmission phase, the said destination
- generates a reception modulation signal, the said reception modulation signal being generated randomly from a first type of reception modulation signal and a second type of reception modulation signal,
- modulates the said modified transmission signal by the said reception modulation signal,
- selectively detects the said first value of a first relative phase of the spectral transmission components or the said second value of a first relative phase of the spectral transmission components when the said modified reception signal corresponds to a modulation by the said first type of reception modulation signal, and
- selectively detects the said first value of second intensity of the spectral transmission components or the said second value of second intensity of the spectral transmission components when the said modified reception signal corresponds to a modulation by the said second type of modulation signal.

An embodiment of the invention is now described with reference to the accompanying figures, in which.

Figure 1:
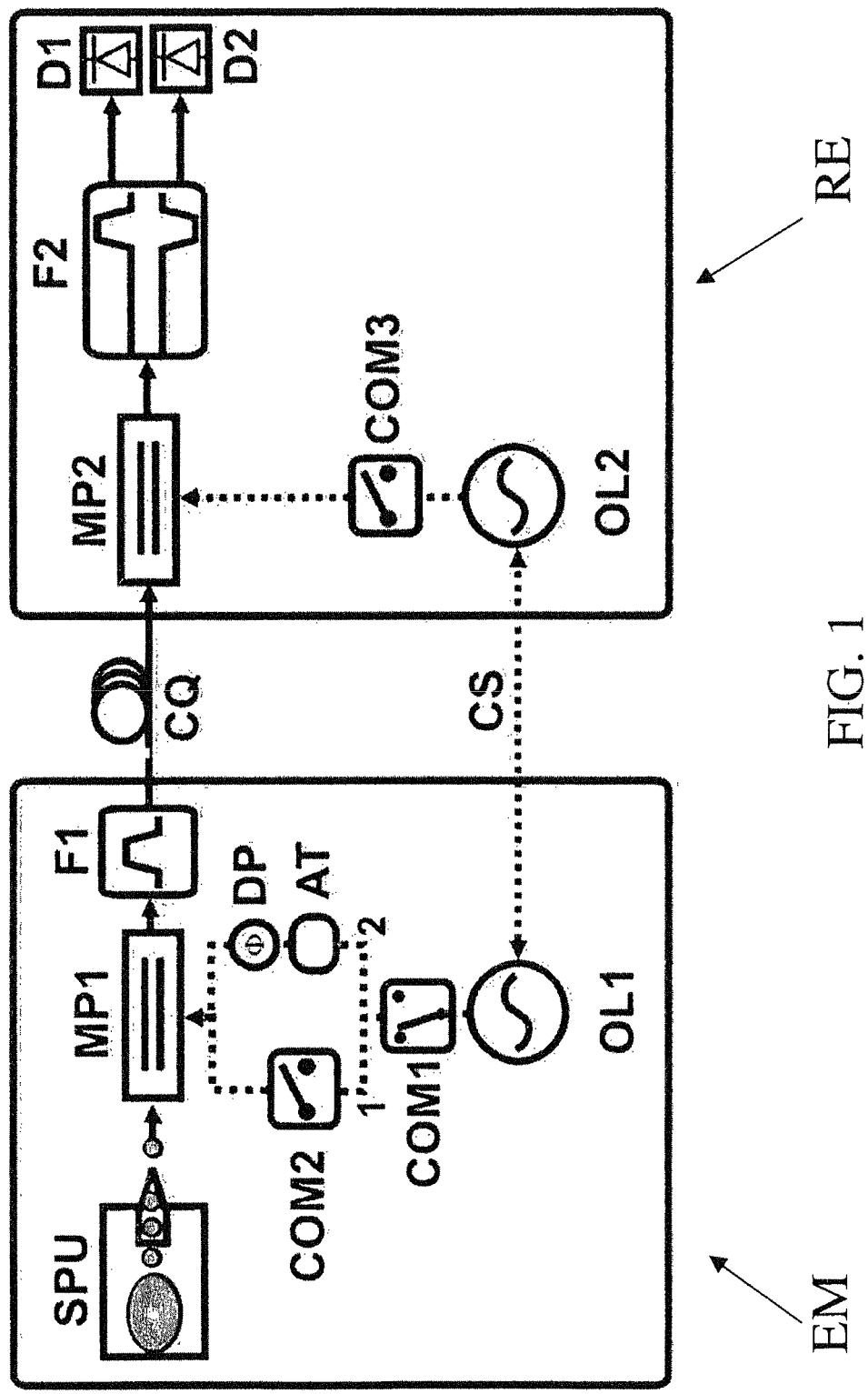
FIG. 1 depicts a transmission system according the invention.

As illustrated in FIG. 1, a binary code optical transmission system according to the invention comprises a transmitter EM and a receiver RE. The transmitter EM comprises a source SPU arranged to generate an electromagnetic signal. The source SPU corresponds for example to a single-photon source arranged to generate single photons. The single photons issuing from the source SPU are transmitted to a first phase modulator MP1, itself arranged to transmit a signal to a filter F1. The transmitter EM also comprises an oscillator OL1 arranged to generate an electrical signal. This electrical signal can be transmitted to an assembly for processing this electrical signal comprising a first variable attenuator AT1 and a phase shifter DP. The signal obtained at the output of the processing assembly is transmitted to the modulator MP1 in order to modulate the electromagnetic signal before it is transmitted to the filter F1.

The receiver RE comprises a second phase modulator MP2, a rejection filter F2, two detectors D1 and D2, an oscillator OL2 and a variable attenuator AT2. The oscillator OL2 is arranged to generate an electrical signal and to transmit this signal to the variable attenuator AT2. This signal can then be transmitted to the modulator MP2, which is arranged to modulate an electromagnetic signal received from the transmitter EM by a quantum channel CQ, according to the electrical signal. This modulated signal is then transmitted to the rejection filter F2, which is itself connected to the detectors D1 and D2.

The oscillator OL1 is also synchronised with the oscillator OL2 by a synchronisation channel CS. In this way the optical spectral components at the transmitter and receiver have a fixed phase relationship.

A description is now given of the functioning of the optical transmission system as previously described.

For the purpose of the present application, the normal notations in the field of quantum cryptography will be used. In particular, the Dirac notation $|u\rangle$ will be used to designate a quantum state.

According to the invention, the single-photon source SPU therefore generates an electromagnetic signal corresponding for example to a single-photon state of optical angular frequency $\omega_0$ denoted $|1\omega_0\rangle$. The oscillator OL1 also generates a radio-frequency electrical signal which, at the output from the processing assembly consisting of the attenuator AT1 and the phase shifter DP, has an amplitude denoted "a", and a relative phase denoted "Φ". As described in the publication by Boucher and Debuisschert "Experimental implementation of time-coding quantum key distribution", Phys. Rev. A 72, 062325, 2005, the state of the electromagnetic signal output from the phase modulator MP1 is a state denoted $|a, \Phi\rangle$ with $$|a, \phi\rangle = \sum_{p=-\infty}^{+\infty} |1_{\omega_0+p\Omega}\rangle J_p(a) \exp\left(ip\left(\phi - \frac{\pi}{2}\right)\right)$$

In this expression, $\Omega$ designates the angular frequency of the radio-frequency electrical signal injected into the phase modulator MP1, a and $\Phi$ represent respectively the intensity and relative phase of this signal, and $J_p$ designates the Bessel function of order p.

Figures 2A, 2B:
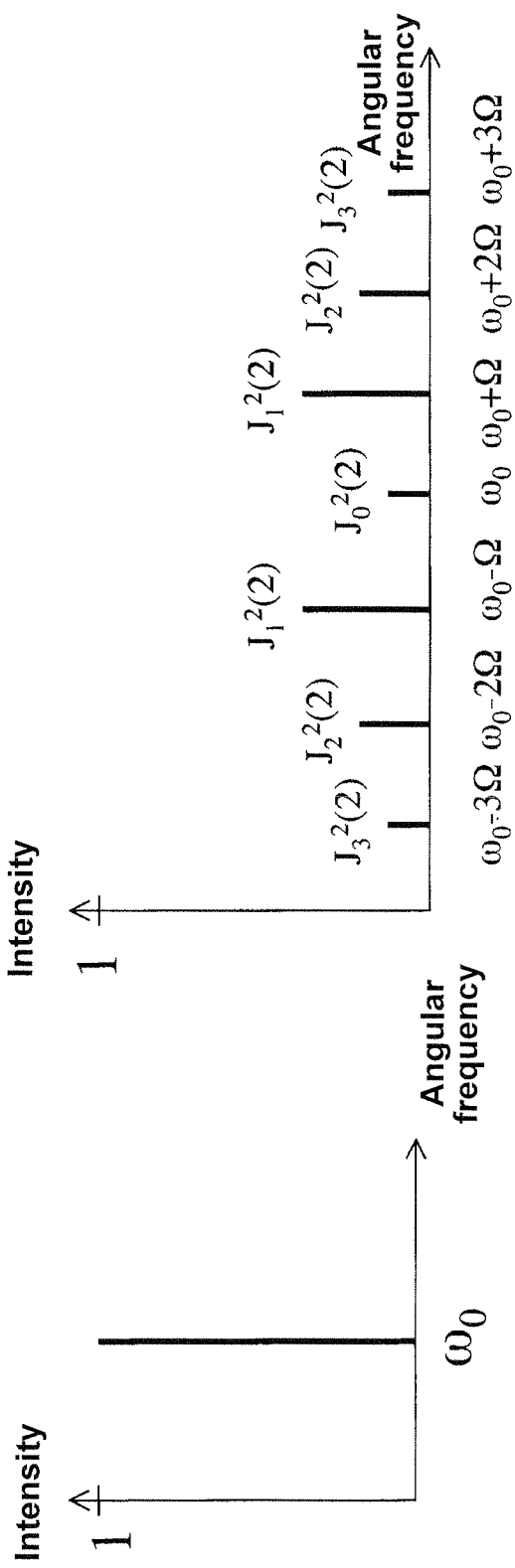
FIG. 2A and FIG. 2B depict respectively the energy spectral density of the single-photon states before modulation, and after modulation at the transmitter.

FIG. 2A represents the energy spectral density of the single-photon state $|1\omega_0\rangle$, that is to say before modulation, and FIG. 2B shows the energy spectral density of the single-photon state $|a, \Phi\rangle$, that is to say after modulation by the modulator MP1 for a=2 and $\Phi$=0.

According to the invention, in order to be able to use a four-state protocol such as the BB84 protocol, it is necessary to define four states orthogonal in pairs and forming incompatible bases. For the states generated by means of the modulator MP1, these properties are expressed as follows:

$$\langle a_i, \phi_i | a_j, \phi_j \rangle = \delta_{ij} \quad (1)$$

$$|\langle a_i, \phi_i | a_j, \phi_j \rangle|^2 = \frac{1}{2}. \quad (2)$$

Equation (1) above represents the condition of orthogonality of the bases, and condition (2) represents the condition of incompatibility of the bases.

However, these conditions are difficult to obtain because of the infinite dimension of the Hilbert space corresponding to the infinity of angular frequencies necessary for describing a state generated at the output of the modulator MP1.

According to the invention, a bandpass filter F1 is therefore used for decreasing the dimension of this space. Therefore there are only the angular frequency values $\omega_0-\Omega$, $\omega_0$ and $\omega_0+\Omega$.

According to the invention, four normed states are defined forming two bases approximately satisfying conditions (1) and (2). The first base corresponds to the states denoted $|+1\rangle$ and $|-, 1\rangle$ defined by equations (3) and (4) and the second base corresponds to the states denoted $|+, 2\rangle$ and $|-, 2\rangle$ defined by equations (6) and (7):

$$|+, 1\rangle = \frac{1}{2}\left[-\exp\left(i\frac{\pi}{2}\right) | 1_{\omega_0-\Omega}\rangle + \sqrt{2} \left| 1_{\omega_0} \right\rangle + \exp\left(-i\frac{\pi}{2}\right) \left| 1_{\omega_0+\Omega} \right\rangle\right] \quad (3)$$

$$|+, 1\rangle = \frac{1}{2}\left[-\exp\left(-i\frac{\pi}{2}\right) | 1_{\omega_0-\Omega}\rangle + \sqrt{2} \left| 1_{\omega_0} \right\rangle + \exp\left(i\frac{\pi}{2}\right) \left| 1_{\omega_0+\Omega} \right\rangle\right] \quad (4)$$

with $J_0(a_0)=\sqrt{2}J_1(a_0)$ and $a_0$ the amplitude of the electrical modulation signal (5)

$$|+, 2\rangle = |1_{\omega_0}\rangle \quad (6)$$

$$|-, 2\rangle = \frac{1}{\sqrt{2}}\left[-\exp\left(i\frac{\pi}{2}\right) | 1_{\omega_0-\Omega}\rangle + \exp\left(-i\frac{\pi}{2}\right) \left| 1_{\omega_0+\Omega} \right\rangle\right] \quad (7)$$

with $J_0(a_1)=0$ (8)

It can easily be verified that these four states $|+, 1\rangle$, $|-1\rangle$, $|+, 2\rangle$ and $|-, 2\rangle$ form two incompatible bases and are therefore orthogonal in pairs. The spectral components of angular frequency $\omega_0-\Omega$ and $\omega_0+\Omega$ characterising the states $|+, 1\rangle$ and $|-, 1\rangle$ differ through the phase and are out of phase by a phase of $\pi$. The spectral components of angular frequency $\omega_0-\Omega$, and $\omega_0+\Omega$ characterising the states $|+, 2\rangle$ and $|-, 2\rangle$ differ through the intensity.

These states are generated on the transmitter EM side by means of the switches of the phase shifter DP and of the attenuator AT1.

When the phase shifter DP does not phase-shift the electrical signal generated by the oscillator OL1, the choice of the base corresponds to the base 2. The attenuator AT2 therefore makes it possible to select the generation of the state $|+, 2\rangle$ when it deactivates a signal, or state $|-, 2\rangle$ when it activates the electrical modulation signal and fixes the amplitude in order to satisfy equation (8).

When the attenuator AT1 reduces the amplitude of the signal so as to satisfy equation (5) above, the choice of the base corresponds to the base 1. The phase shifter DP for its part makes it possible to select the generation of the state $|+, 1\rangle$ or the state $|+, 1\rangle$.

The modulated and filtered signal is then transmitted to the receiver RE via the quantum channel CQ. In accordance with a four-state protocol of type BB84, the receiver RE must be arranged to determine the signal received when the measurement base is correctly chosen.

To do this, the oscillator OL2 is first of all synchronized with the oscillator OL1 by a synchronization channel CS so as to generate a radio-frequency signal the amplitude of which satisfies equation (5) with the same frequency and the phase of which compensates for the phase difference introduced by the propagation of the optical signal via the quantum channel CQ. The radio-frequency signal on the reception side makes it possible to modulate, by means of the modulator MP2, the signal received from the transmitter EM. The attenuator AT2 for its part makes it possible to select the measurement base 1 or 2 by deactivating or activating the modulation signal. The attenuator AT2 is arranged so that the absence of modulation corresponds to a measurement in the base 2 and the presence of modulation corresponds to a measurement in the base 1. The bandpass optical filter F2 reduces the number of spectral components generated by the modulation of the optical signal received. Thus the optical signal is formed by no more than three angular frequencies $\omega_0-\Omega$ and $\omega_0+\Omega$.

It is now described how the receiver can detect and store bits transmitted according to the choice of the measurement base.

This case is illustrated assuming first of all that the base used for coding the 0 and 1 bits is the base 1 on the transmitter side.

In this case; when the attenuator AT2 deactivates the modulation signal, the measurement corresponds to a measurement in the base 2. At the input of the rejection filter F3, the spectrum of the signal is then composed of three frequencies since the signal is expressed in the base 1. The filter F3 is a filter that separates the signals of angular frequency $\omega_0$ and the signals of the other angular frequencies. The signals of angular frequency $\omega_0$ are transmitted to the detector D1, and the other signals are transmitted to the detector D2.

However, equation (5) indicates that the probability of finding the photon in the centre band of angular frequency $\omega_0$ is equal to the probability of finding the photon in the two bands of angular frequency $\omega_0+\Omega$ and $\omega_0-\Omega$. Thus, whatever the state used, $|+, 1\rangle$ or $|-, 1\rangle$, the probabilities of detection on D1 and D2 are equiprobable. In this case, it is therefore not possible to determine the value of the bit transmitted. This situation of uncertainty is represented by a question mark "?" in table 1 below summarising the four-state protocol according to the invention.

When the attenuator AT2 fixes the modulation amplitude so as to satisfy equation (5) the signal received from the transmitter is modulated by an electrical signal emitted by the oscillator OL2 and the measurement is made in the base 1. The modulation produces an interference between the different angular frequencies of the optical signals that modifies the signal received as follows:

The state $|+, 1\rangle$ is transformed into a modulated state equal to $$\left[-2\sqrt{2}\exp\left(i\frac{\pi}{2}\right)J_1(a_0) + \exp\left(-i\frac{\pi}{2}\right)J_2(a_0)\right] | 1_{\omega_0-\Omega}\rangle +$$

$$\left[2\sqrt{2}\exp\left(-i\frac{\pi}{2}\right)J_1(a_0) + \exp\left(i\frac{\pi}{2}\right)J_2(a_0)\right] | 1_{\omega_0+\Omega}\rangle$$

It should be noted that this state no longer has any component at the angular frequency $\omega_0$. Detection can therefore be made only on the detector D2 after passage through the rejection filter F2. The initial state and therefore the value of the bit transmitted can therefore be determined unambiguously.

In the same way, the state $|-, 1\rangle$ is transformed into a modulated state equal to:

$$J_2(a_0)\exp\left(i\frac{\pi}{2}\right)|1_{\omega_0-\Omega}\rangle + 4J_1(a_0)|1_{\omega_0}\rangle + J_2(a_0)\exp\left(i\frac{\pi}{2}\right)|1_{\omega_0+\Omega}\rangle$$

In this modulated state, the amplitude of the components of angular frequencies $\omega_0+\Omega$ and $\omega_0-\Omega$ is low. Detection can therefore occur on the detector D1 with a high probability, and it is therefore possible to determine the initial state and therefore the value of the bit transmitted with high probability.

It should be noted that the probability of observing a detection on D2 is not zero because of the presence of the angular frequencies $\omega_0+\Omega$ and $\omega_0-\Omega$. Thus the main quantum error rate is approximately 0.3%, which has the effect of reducing the maximum transmission distance.

When base 2 is used for coding the bits of information, it is demonstrated in the same way that, when the attenuator AT2 cuts the modulation signal and the measurement takes place in base 2 on reception, it is possible to determine the initial state are the photon sent, whereas the two transmission states of equiprobable when AT2 fixes the amplitude of the modulation signal so as to satisfy equation (5) and the reception measurement takes place in base 1. This situation of uncertainty is represented by a question mark "?" in table 1 below summarizing the four-state protocol according to the invention.

TABLE 1

| Bases used at the transmitter EM | 1 | | | | 2 | | | |
|---|---|---|---|---|---|---|---|---|
| Values of bits transmitted | 0 | | 1 | | 0 | | 1 | |
| States used | $\|+, 1\rangle$ | | $\|-, 1\rangle$ | | $\|+, 2\rangle$ | | $\|-, 2\rangle$ | |
| Bases used at the receiver | 1 | 2 | 1 | 2 | 1 | 2 | 1 | 2 |
| Bits detected | 0 | ? | 1 | ? | ? | 0 | ? | 1 |
| Bits stored | X | | X | | | X | | X |

Figure 3:
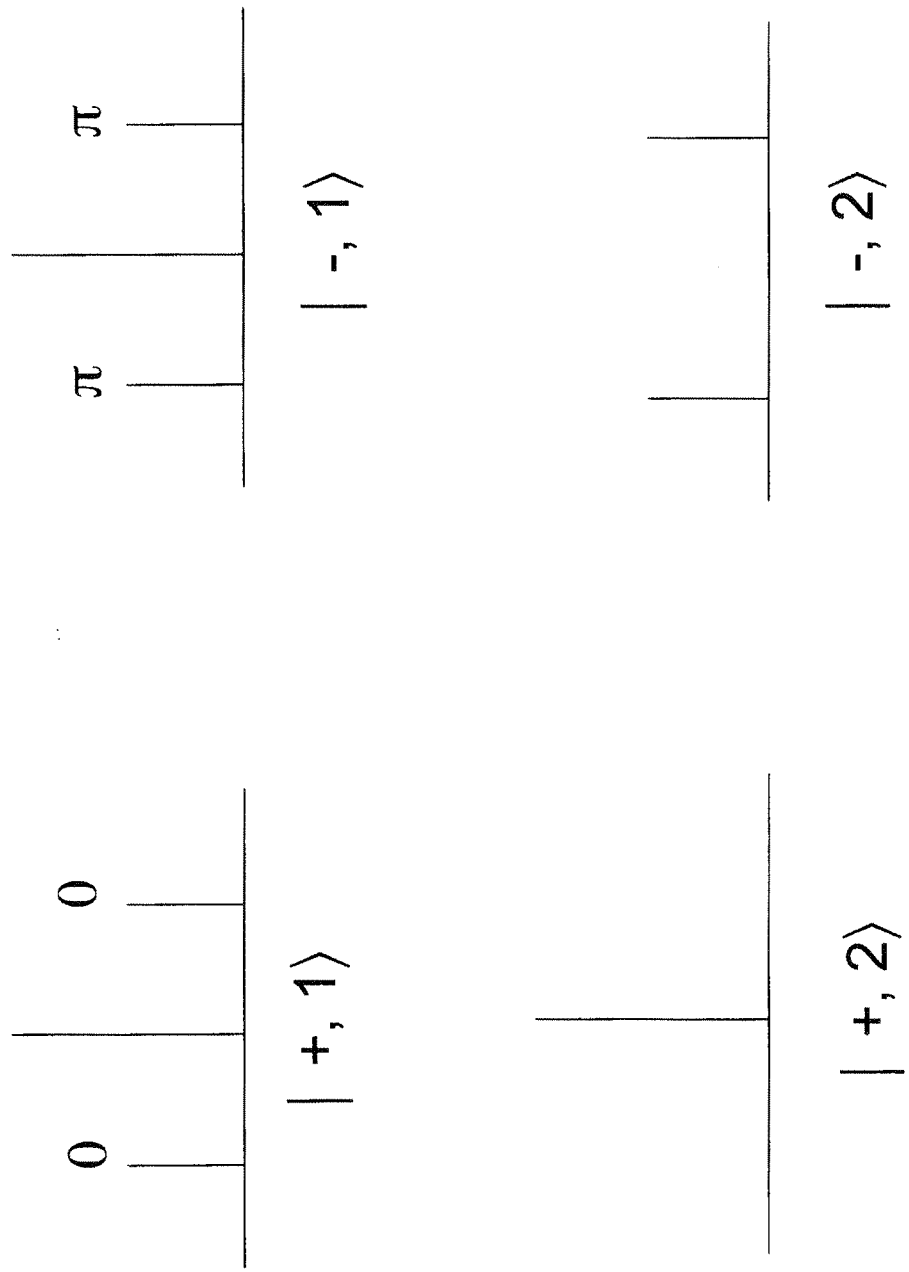
FIG. 3 depicts the energy spectral density of the signals transmitted from the transmitter to the receiver according to the states of the photons.

FIG. 3 also illustrates the spectrum of the signal transmitted to the receiver RE by the transmitter EM according to the state used. This figure shows a centre frequency corresponding to the angular frequency $\omega_0$ and side frequencies corresponding to the angular frequencies $\omega_0+\Omega$ and $\omega_0-\Omega$. For the states $|+, 1\rangle$ and $|-, 1\rangle$, the relative phases of the side frequencies, respectively 0 and $\pi$, are indicated above the sidebands.

Thus, with reference to FIG. 3 and table 1, the bits transmitted can be detected when the two bases used for transmission and reception are identical and cannot be detected when the two bases are different.

According to the invention, the sender, Alice, chooses a state in one of the two bases and sends a photon to the receiver, Bob. Bob then chooses, independently of Alice, a measurement base. If the combination of bases used by Alice and Bob corresponds to a question mark "?" in table 1, the photon will be detected either at the detector D1 or at the detector D2 with the same probability, and the result will be indeterminate.

This situation corresponds to four-state protocol of type BB84 as described in the aforementioned publication "Quantum Cryptography: Public Key Distribution and Coin Tossing".

Figure 4:
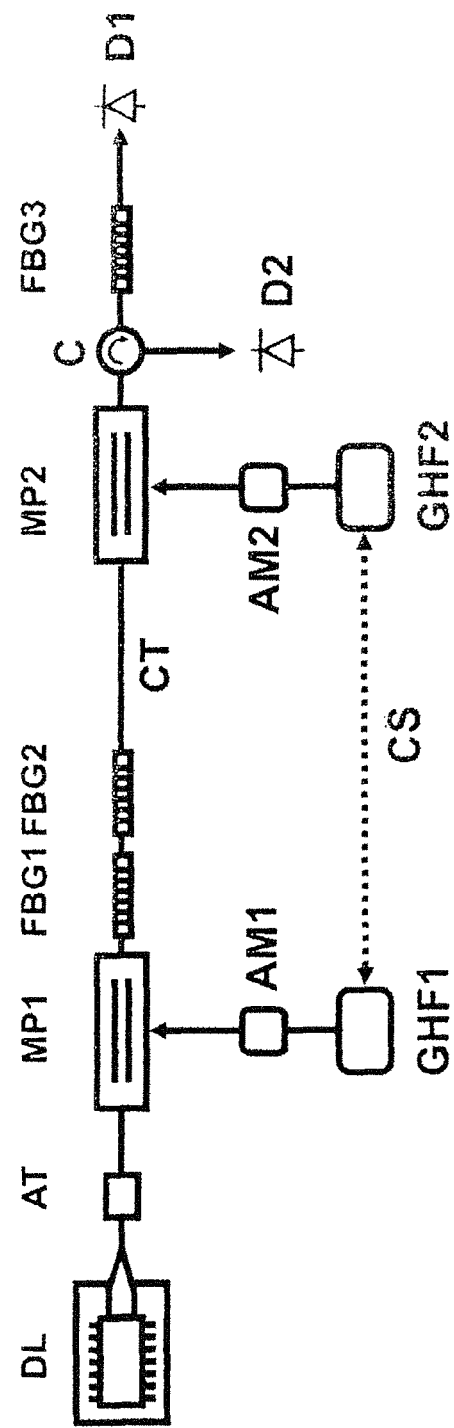
FIG. 4 depicts an assembly for demonstrating the feasibility of the method according to the invention.
Figure 5:
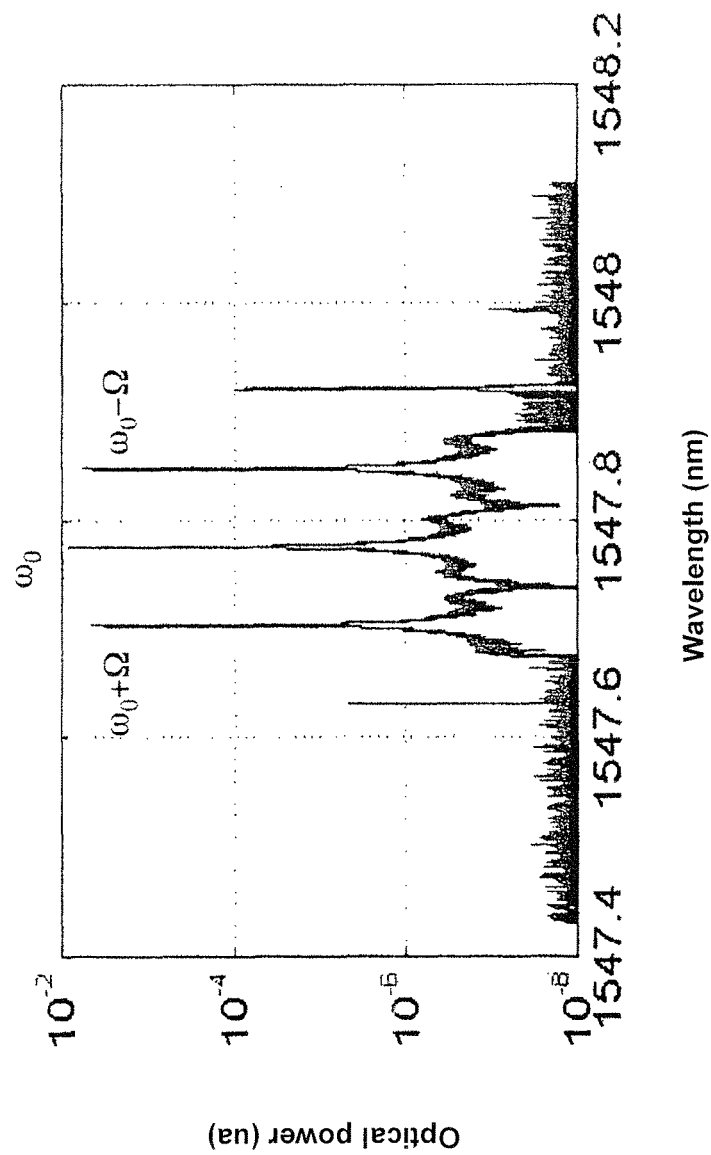
FIG. 5 depicts the spectrum after filtering of a non-attenuated signal equivalent to the state $|+, 1\rangle$ or $|-, 1\rangle$.
Figures 6A, 6B:
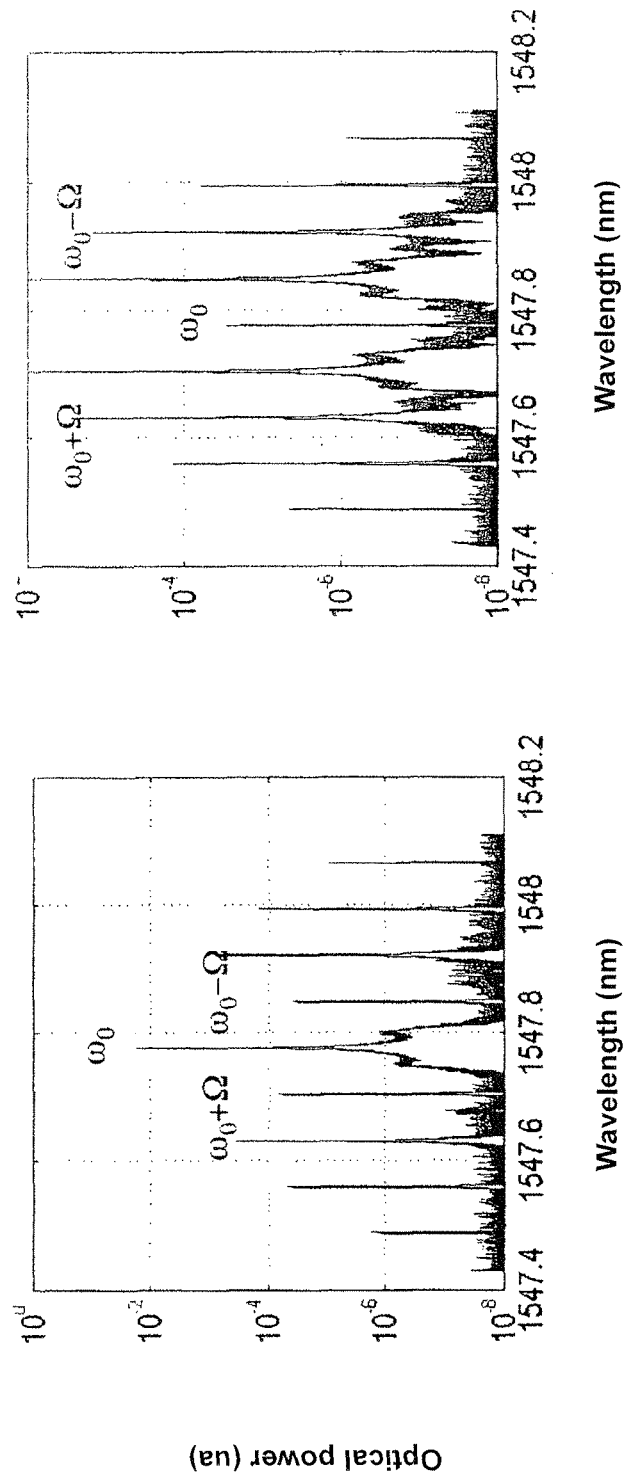
FIG. 6A and FIG. 6B depict the spectrum observed after the phase modulator according to the invention.
Figure 7:
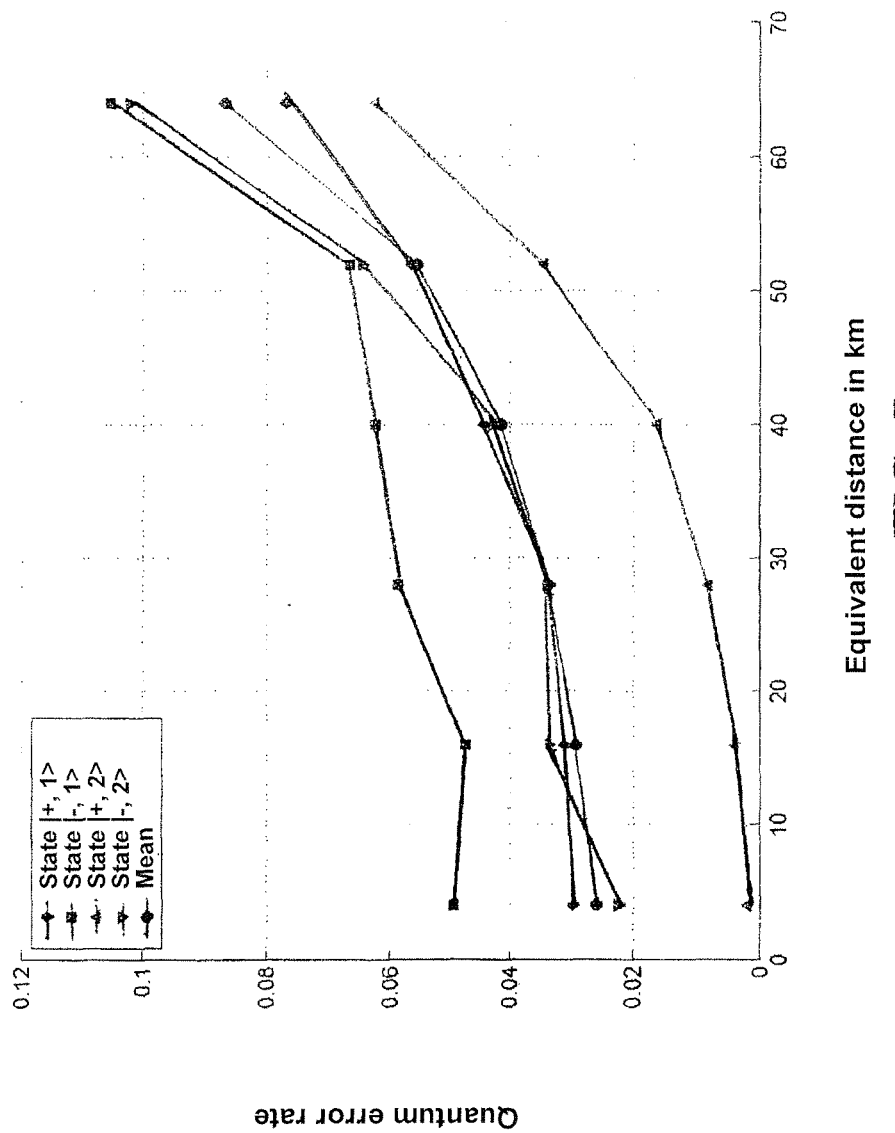
FIG. 7 depicts the error rates observed according to the transmission distance, for the different states.

FIG. 4 shows an assembly for demonstrating the feasibility of the method. The system consists of a type DFB laser diode with an emission wavelength of approximately 1547.8 nm, two electro-optical phase modulators integrated on lithium niobate MP1 and MP2 with a bandwidth of 10 GHz, three Bragg mirror filters FBG1, FBG2, FBG3, a circulator C and two avalanche photodiodes D1 and D2. The transmission channel CT consists of a 1550 nm monomode standard fibre. The attenuator AT attenuates the optical signal in order to simulate a single-photon source. The high-frequency generators GHF1 and GHF2 associated respectively with the amplifiers AM1 and AM2 drive respectively the modulators MP1 and MP2. The frequency of the signal HF used is 8 GHz. A synchronisation signal transmitted via the synchronisation channel CS controls GHF1 and GHF2 for phase. The filters FBG1 and FBG2 constitute a filter equivalent to a bandpass filter of 80 pm. FIG. 5 shows the spectrum after filtering of a non-attenuated signal equivalent to the state $|+, 1\rangle$ or $|-, 1\rangle$. In order to validate the interference principle making it possible to separate these two states, the HF generator GHF1 produces a modulation signal in phase and in phase opposition with respect to the modulation signal generated by GHF2. In this way signals are generated equivalent to the states $|+, 1\rangle$ or $|-, 1\rangle$. FIG. 6A and FIG. 6B show the spectrum observed after the phase modulator MP2, for a modulation respectively in phase and in phase opposition of the optical signal. The extinction rate of the centre peak and of the modulation sidebands for a phase variation of between 0 and $\pi$ of the modulation signal is around 20 dB. The filter FBG3 with a 40 pm passband then makes it possible to separate these two states. Finally, the quantum error rate is estimated by attenuating the signal by means of the attenuator AT and using two avalanche photodiodes D1 and D2 with an efficiency of 13%, the number of dark pulses of which are around 4.5 with a duration of 10 ns. FIG. 7 shows the various error rates observed for the various states used according to the transmission distance. The attenuation of the transmission channel is simulated using the attenuator AT. The attenuation of the receiver is around 3.2 dB. The maximum transmission distance is around 60 km. This distance can be improved by reducing the losses of the receiver and by inserting a bandpass filter as described previously after the modulator MP2.

The invention claimed is:

1. A system for the optical transmission of a binary code comprising a transmitter and a receiver and a reception line extending between said transmitter and said receiver,
   said transmitter comprising:
   generation means (SPU) arranged to generate an electromagnetic signal having physical quantities;
   transmission modification means (AT1, DP, MP1) arranged to modify at least one physical quantity characterising the electromagnetic signal according to the binary code so as to generate a modified transmission signal;
   a transmission line (CQ) being arranged to transmit the modified transmission signal to the receiver;
   the receiver comprising:
   reception modification means (AT2, MP2, OL2) arranged to modify the modified transmission signal so as to generate a modified reception signal;
   detection means (F2, D1, D2) arranged to detect the values of the physical quantities characterising the modified reception signal,
   wherein the transmission modification means are arranged to modify at least a first physical quantity and a second physical quantity of the electromagnetic signal, in which the first physical quantity is an intensity of spectral components of the electromagnetic signal and the second physical quantity is a relative phase of the spectral components, so as to generate the modified transmission signal, the modified transmission signal being chosen randomly from at least a first type of modified transmission signal and a second type of modified transmission signal, in which, for the first type of modified transmission signal, the first physical quantity is constant, and the second physical quantity depends on a bit value of the binary code such that the first type of modified transmission signal comprises encoding states that differ only by the second physical quantity, and for the second type of modified transmission signal the second physical quantity is constant and the first physical quantity depends on a bit value of the binary code such that the second type of modified transmission signal comprises encoding states that differ only by the first physical quantity, and in that the detection means are arranged to determine a value of the first physical quantity and a value of the second physical quantity.

2. The system according to claim 1, in which the transmission modification means comprise transmission modulation means (AT1, DP, MP1) arranged to modulate the electromagnetic signal according to the binary code so as to generate the modified transmission signal, wherein spectral components of the first type of modified transmission signal have a first transmission intensity and a first relative transmission phase, and spectral components of the second type of modified transmission signal have a second transmission intensity and a second relative transmission phase;

the first transmission intensity of the spectral components having a first value of first transmission intensity for a first bit value of the binary code, and a second value of first transmission intensity for a second bit value of the binary code, the first value of first intensity modified being equal to the second value of first intensity modified, the first relative transmission phase of the spectral components having a first value of a first relative transmission phase for a first bit value of the binary code, and a second value of the first relative transmission phase for a second bit value of the binary code, the first value of the first relative transmission phase being different from the second value of the first relative transmission phase, the second transmission intensity of the spectral components having a first value of second transmission intensity for a first bit value of the binary code, and a second value of second transmission intensity for a second bit value of the binary code, the first value of second transmission intensity being different from the second value of second transmission intensity, the second relative transmission phase of the spectral components having a first value of a second relative transmission phase for a first bit value of the binary code, and a second value of a second transmission phase for a second bit value of the binary code, the first value of a second relative transmission phase being equal to the second value of a second relative transmission phase, and in that the reception modification means comprise reception modulation means arranged to generate a reception modulation signal and to modulate the modified transmission signal by the reception modulation signal, the reception modulation signal being chosen randomly between a first type of reception modulation signal and a second type of reception modulation signal, the detection means being arranged to selectively detect the first value of first relative transmission phase of the spectral components of the modified transmission signal or the second value of first relative transmission phase of the spectral components of the modified transmission signal when the modified reception signal corresponds to a modulation by the first type of reception modulation signal, and to selectively detect the first value of second transmission intensity of the spectral components of the modified transmission signal or the second value of second transmission intensity of the spectral components of the modified transmission signal when the modified reception signal corresponds to a modulation by the second type of reception modulation signal.

3. The system according to claim 2, in which the transmission modulation means (OL1, AT1, DP, MP1) comprise:
 a first generator (OL1) arranged to generate a first electrical signal;
 transmission signal modification means (AT1, DP) arranged to modify the first electrical signal so as to generate a modified electrical signal;
 a transmission modulator (MP1) arranged to modulate the electromagnetic signal by the modified electrical signal so as to generate the modified transmission signal; and
 in which the reception modulation means comprise:
 a second generator (OL2) arranged to generate a second electrical signal;
 a reception modulator arranged to modulate the modified transmission signal by means of the second electrical signal.

4. The system according to claim 3, in which the transmission signal modification means comprise a first attenuator arranged to fix an intensity of the modified electrical signal at a first electrical signal intensity value for a first bit value of the binary code, and at a second electrical signal intensity value for a second bit value of the binary code, and a phase shifter arranged to fix a phase of the modified electrical signal at a first electrical signal phase value for a first bit value of the binary code, and at a second electrical signal phase value for a second bit value of the binary code.

5. A transmitter in a system for transmitting an optical code, comprising:
 generation means (SPU) arranged to generate a first electromagnetic signal;
 transmission modification means (AT1, DP, MP1) arranged to modify at least one physical quantity characterising the first electromagnetic signal according to a binary code so as to generate a modified transmission signal;
 wherein the transmission modification means are arranged to modify values of at least a first physical quantity and a second physical quantity of the first electromagnetic signal, in which the first physical quantity is an intensity of spectral components of the first electromagnetic signal and the second physical quantity is a relative phase of the spectral components, so as to generate the modified transmission signal, the modified transmission signal being chosen randomly from at least a first type of modified transmission signal and a second type of modified transmission signal, in which, for the first type of modified transmission signal, the first physical quantity is constant, and the second physical quantity depends on a bit value of the binary code such that the first type of modified transmission signal comprises encoding states that differ only by the second physical quantity, and for the second type of modified transmission signal the second physical quantity is constant and the first physical quantity depends on a bit value of the binary code such that the second type of modified transmission signal comprises encoding states that differ only by the first physical quantity.

6. The transmitter according to claim 5, in which the transmission modification means comprise transmission modulation means (AT1, DP, MP1) arranged to modulate the first electromagnetic signal according the binary code so as to generate the modified transmission signal, wherein spectral components of the first type of modified transmission signal have a first transmission intensity and a first relative transmission phase, and spectral components of the second type of modified transmission signal have a second transmission intensity and a second relative transmission phase;

the first transmission intensity of the spectral components having a first value of first transmission intensity for a first bit value of the binary code, and a second value of first transmission intensity for a second bit value of the binary code, the first value of first intensity modified being equal to the second value of first intensity modified, the first relative transmission phase of the spectral components having a first value of a first relative transmission phase for a first bit value of the binary code, and a second value of a first relative transmission phase for a second bit value of the binary code, the first value of a first relative transmission phase being different from the second value of the first relative transmission phase of the spectral components, the second transmission intensity of the spectral components having a first value of a second transmission intensity for a first bit value of the binary code, and a second value of second transmission intensity for a second bit value of the binary code, the first value of a second transmission intensity being different from the second value of second transmission intensity, the second relative transmission phase of the spectral components having a first value of a second relative transmission phase for a first bit value of the binary code, and a second value of a second relative transmission phase for a second bit value of the binary code, the first value of a second relative transmission phase being equal to the second value of a second relative transmission phase.

7. The transmitter according to claim 6, in which the transmission modulation means (OL1, AT1, DP, MP1) comprise:
a first generator (OL1) arranged to generate a first electrical signal;
transmission signal modification means (AT1, DP) arranged to modify the first electrical signal so as to generate a modified electrical signal;
a transmission modulator (MP1) arranged to modulate the electromagnetic signal by the modified electrical signal so as to generate the modified transmission signal.

8. The transmitter according to claim 7, in which the transmission signal modification means comprise an attenuator for randomly generating, as a modified electrical signal, a first type of modified electrical signal or a second type of modified electrical signal, for a first bit value of the binary code, and at a second electrical signal intensity value for a second bit value of the binary code, and a phase shifter arranged to fix a phase of the first type of modified electrical signal at a first electrical signal phase value for a first bit value of the binary code, and at a second electrical signal phase value for a second bit value of the binary code.

9. A receiver in a binary code optical transmission system, the receiver being arranged to receive the modified transmission signal transmitted by a transmitter according to one of claim 7, 6, 7, or 8, the receiver comprising:
reception modification means (AT1, MP2, OL2) arranged to modify the modified transmission signal so as to generate a modified reception signal;
detection means (F2, DI, D2) arranged to detect the physical quantities characterising the modified reception signal
wherein the detection means are arranged to determine a value of the first physical quantity and a value of the second physical quantity.

10. The receiver according to claim 9, in which the reception modification means comprise reception modulation means arranged to generate a reception modulation signal and to modulate the modified transmission signal by the reception modulation signal, the reception modulation signal being generated randomly from a first type of reception modulation signal and a second type of reception modulation signal, the detection means being arranged to selectively detect the first value of the first relative transmission phase of the spectral components or the second value of the first relative transmission phase of the spectral components when the modified reception signal corresponds to a modulation by the first type of reception modulation signal, and to selectively detect the first value of second transmission intensity of the spectral components or the second value of second transmission intensity when the modified reception signal corresponds to a modulation by the second type of modulation signal.

11. A method for the optical transmission of a binary code between a sender and a destination, comprising:
the sender:
generating an electromagnetic signal characterised by a set of physical quantities;
modifying at least one physical quantity of the electromagnetic signal according to the binary code so as to generate a modified transmission signal;
the destination:
receiving the modified transmission signal;
modifying the modified transmission signal so as to generate a modified reception signal;
detecting physical quantities of the modified reception signal,
wherein the sender modifies at least a first physical quantity and a second physical quantity of the electromagnetic signal, in which the first physical quantity is an intensity of spectral components of the electromagnetic signal and the second physical quantity is a relative phase of the spectral components, so as to generate the modified transmission signal, the modified transmission signal being chosen randomly from at least a first type of modified transmission signal and a second type of modified transmission signal,
in which, for the first type of modified transmission signal, the first physical quantity is constant and the second physical quantity depends on a bit value of the binary code such that the first type of modified transmission signal comprises encoding states that differ only by the second physical quantity, and for the second type of modified transmission signal the second physical quantity is constant and the first physical quantity depends on a bit value of the binary code such that the second type of modified transmission signal comprises encoding states that differ only by the first physical quantity, and
the destination determines a value of the first physical quantity and a value of the second physical quantity.

12. The method according to claim 11, in which the sender modulates the electromagnetic signal according to the binary code so as to generate the modified transmission signal, wherein spectral components of the first type of modified transmission signal have a first transmission intensity and a first relative transmission phase, and spectral components of the second type of modified transmission signal have a second transmission intensity and a second relative transmission phase,

- the first transmission intensity of the spectral components having a first value of first transmission intensity for a first bit value of the binary code, and a second value of first transmission intensity for a second bit value of the binary code, the first value of first intensity modified being equal to the second value of first intensity modified,
- the first relative transmission phase of the spectral components having a first value of a first relative transmission phase for a first bit value of the binary code, and a second value of a first relative transmission phase for a second bit value of the binary code, the first value of a first relative transmission phase being different from the second value of a first relative transmission phase,
- the second transmission intensity of the spectral components having a first value of a second transmission intensity for a first bit value of the binary code, and a second value of second transmission intensity for a second bit value of the binary code, the first value of a second transmission intensity being different from the second value of second transmission intensity,
- the second relative transmission phase of the spectral components having a first value of a second relative transmission phase for a first bit value of the binary code, and a second value of a second relative transmission phase for a second bit value of the binary code, the first value of a second relative transmission phase being equal to the second value of a second relative transmission phase, the destination:

generates a reception modulation signal, the reception modulation signal being generated randomly from a first type of reception modulation signal and a second type of reception modulation signal modulates the modified transmission signal by the reception modulation signal, selectively detects the first value of the first relative transmission phase of the spectral components or the second value of the first relative transmission phase of the spectral components when the modified reception signal corresponds to a modulation by the first type of reception modulation signal, and selectively detects the first value of second transmission intensity of the spectral components or the second value of second transmission intensity of the spectral components when the modified reception signal corresponds to a modulation by the second type of reception modulation signal.

* * * * *